(No Model.)

J. L. ZINK & C. W. MEGGENHOFEN.
CASTER.

No. 590,289. Patented Sept. 21, 1897.

WITNESSES:
Doyl Comer
Sherman Mott

INVENTORS.
James L. Zink, and
Charles W. Meggenhofen,
BY V. H. Lockwood
Their ATTORNEY.

UNITED STATES PATENT OFFICE.

JAMES LILLY ZINK AND CHARLES W. MEGGENHOFEN, OF INDIANAPOLIS, INDIANA.

CASTER.

SPECIFICATION forming part of Letters Patent No. 590,289, dated September 21, 1897.

Application filed September 14, 1896. Serial No. 605,814. (No model.)

*To all whom it may concern:*

Be it known that we, JAMES LILLY ZINK and CHARLES W. MEGGENHOFEN, of Indianapolis, county of Marion, and State of Indiana, have invented a certain new and useful Caster; and we do hereby declare that the following is a full, clear, and exact description thereof, reference being had to the accompanying drawings, in which like figures refer to like parts.

Our invention relates to improvements in that class of casters which permit the furniture or other object with which they are connected to rest on the floor while stationary, but when removal is desired the caster will elevate the object from the floor and support it until it has been moved, when the object can again be let down on the floor. We have used it with heavy objects having comparatively broad legs or supports. This permits the object to be absolutely stationary on the floor and to have a strong broad support which does not cut into the floor, yet removal is rendered easy.

The full nature of our invention will be better understood from the accompanying drawings and the following description.

Figure 1:
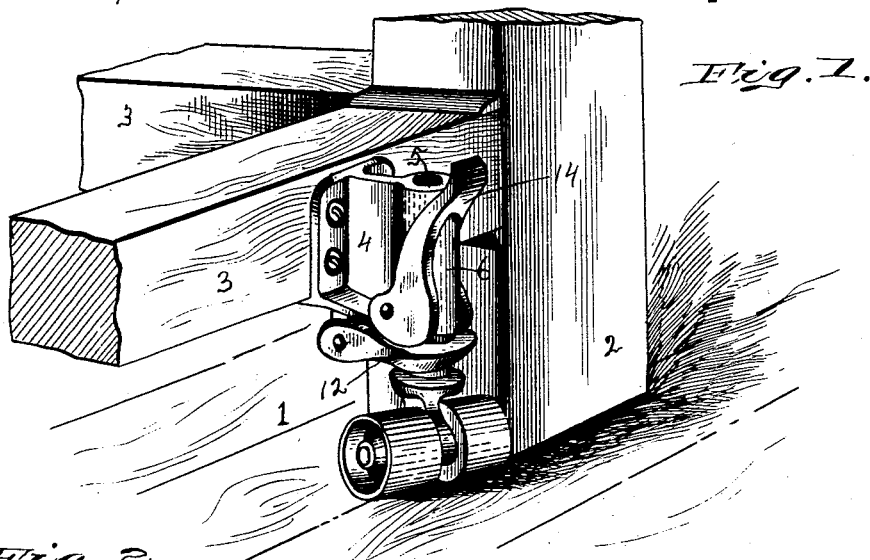
Figure 2:
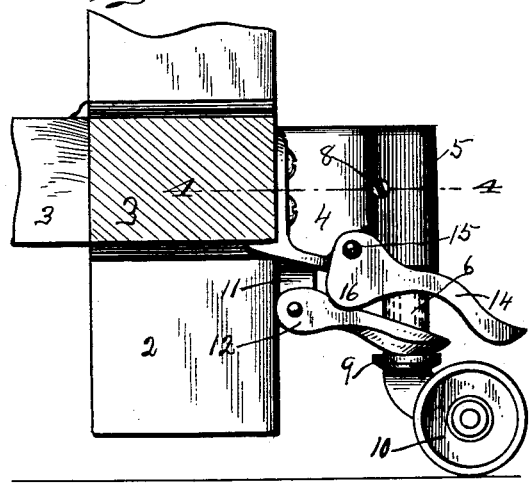
Figure 3:
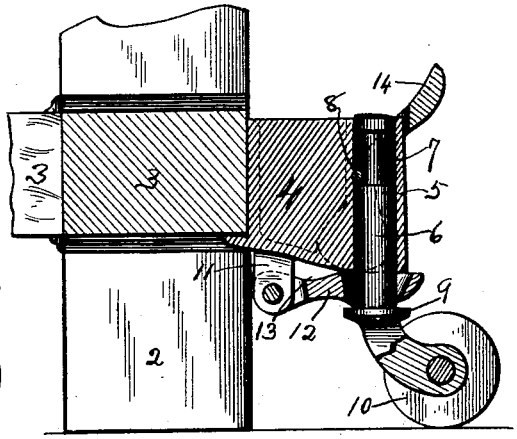
Figure 4:
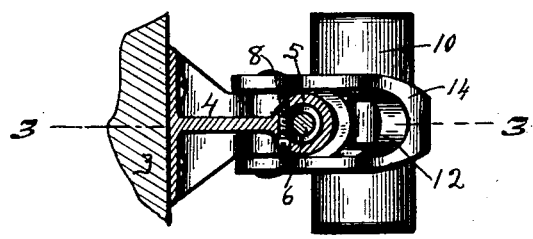

In the drawings, Figure 1 is a perspective of a section of floor and a portion of the supporting-frame of an object having secured to it our caster, the object in such drawing resting on the floor. Fig. 2 is the same with the object elevated and supported by the caster. Fig. 3 is a side view of the caster as shown in Fig. 1, parts being in vertical section. Fig. 4 is a plan view, parts being in cross-section.

In detail, 1 is the floor upon which in Fig. 1 rests the leg 2 of an article of furniture or similar object. The cross-bars 3 connect such leg with other legs to form a frame. It is observed that the cross-bars in the drawings are secured to the leg a small distance above its lower end. Our caster is preferably attached to the cross-bars, although it might be attached to the legs or a flange thereon.

As shown here, our caster consists of a frame or bracket 4, that is secured to the object to be moved. It contains a vertical socket or bearing 5, through which the shank 6 of the caster extends. The shank is so mounted in the bearing as to have a limited reciprocating movement. This is accomplished in the form shown by turning down a portion of the shank at 7 and providing the pin or stop 8 in the bearing that engages the shank at the end of the turned-down portion and limits the vertical movement.

The caster-shank 6 has at its lower end a shoulder 9, below which are the rollers 10. To the ear 11 on the bracket there is pivoted an arm 12, that at its free end has a beveled bearing-place that rests upon the shoulder 9. In its free end it is provided with an aperture for the shank of the caster, whereby such end of the arm is prevented from having lateral movement. The upper surface of the arm 12 is smoothed or flattened to form a bearing-surface. It is preferable to provide it with a slight depression 13 for the purpose hereinafter mentioned.

The furniture or other object is elevated on the caster by means of a cam-lever 14, pivoted at 15 to the bracket or object supported, so that its cam-face 16 will engage the upper surface of the arm 12. When the caster is not supporting the object, the lever and the other parts are in the position shown in Fig. 1. To elevate the object, the cam-lever is depressed by the foot or otherwise until the parts assume the position shown in Fig. 2. The cam should be so formed that the point of contact between it and the arm 12 would fall behind a vertical line through the pivotal point 15. Then the caster will hold the object elevated until the lever 14 is thrown up into its original position. To make the hold between the cam and the arm 12 positive, the contacting-point of the cam should rest in the depression 13 in the upper surface of the arm.

Obviously the frame or bracket 4 could be dispensed with and the caster connected up directly with the furniture or the object in exactly the same manner as herein shown and described. Also, the cam-lever could be reversed, being pivoted to the caster and bearing upward on the bracket or part in which the caster is mounted, without altering the principle of our invention.

What we claim as our invention, and desire to secure by Letters Patent, is—

1. The combination of a caster whose shank is provided with a shoulder at its lower end, the object to be supported by such caster in which the caster has limited vertical movement, an arm pivoted at one end to such object and having a beveled bearing-place at the other end resting upon the shoulder of the caster, and a cam-lever pivoted to such object and bearing on the pivoted arm, substantially as shown and described.

2. The combination of a caster with a shank which is recessed between its ends and has a shoulder at its lower end, a socket in the object to be supported for such shank provided with a pin that extends into such recess, an arm pivoted at one end to the object to be supported and at the other end having a beveled bearing-place resting on the shoulder, and a cam-lever pivoted to the object to be supported and bearing on such pivoted arm, substantially as shown and described.

3. A caster comprising a frame adapted to be secured to the object to be supported having in it a vertical socket, a caster-shank that has limited movement in such vertical socket and a shoulder near its lower end, a lever pivoted to one end of such frame and provided at the free end with an opening through which the shank extends and with a beveled bearing-place resting upon the shoulder of the caster-shank and about its middle portion provided with a depression, and a cam-lever pivoted to such frame so as to engage the upper surface of the lever and when the object to be supported is elevated will pass a vertical line through its pivotal point and rest in the depression in such lever.

In witness whereof we have hereunto set our hands this 17th day of August, 1896.

JAMES LILLY ZINK.
CHARLES W. MEGGENHOFEN.

Witnesses:
V. H. LOCKWOOD,
T. L. STOCKDELL.